Patented July 4, 1933

1,917,176

UNITED STATES PATENT OFFICE

ALEXANDER WINOGRADOW, OF NEW YORK, N. Y.

PROCESS OF IMPREGNATING FIBER BOARD WITH SOLID SUBSTANCES

No Drawing.  Application filed July 1, 1932. Serial No. 620,537.

This application is a continuation in part of my application Serial #469,938, filed July 22, 1930 for a Process of fireproofing fiber board and of my application Serial #471,-604, filed July 29, 1930 for a Process of impregnating porous material with fireproofing chemicals, the subject matter of these applications being embodied in this application.

This invention relates to the impregnation, with chemical compounds, of fiber board having the characteristics of such products bearing the trade names of Celotex, Nu-wood, Maftex, Vazcane and Insulating Board. These contain wood fiber obtained from various sources such as wood pulp, the fibers of the roots of licorice and sugar cane. This type of board is light and porous, elastic, and readily compressible. It is a property of this material, even though porous, that it is not readily wet by water. If it be desired to fireproof the board, it is impregnated with a fireproofing substance. By impregnating the board it can be stiffened. By impregnation with a substance harmful or distasteful to insects it can be made insect-proof.

The invention will be described in connection with impregnation of the board with fireproofing chemicals, but it is to be understood that impregnation with other substances and for other purposes can be done as well.

The process consists essentially in causing the board to absorb completely the desired chemical in solution in one liquid, said chemical being such that it is insoluble in another liquid than the solvent used, then squeezing the board to remove a portion of the solution from within the board, then causing said other liquid to enter the board, preferably by forced impregnation, as described hereafter, and to mix with the solution remaining, whereat the chemical is uniformly precipitated throughout the material. The board is then dried. After precipitation, however, it is a preferred further step to squeeze the board again, before drying for the removal of a substantial portion of the solvent and other liquid.

Organic solvents may be used which are miscible with water and in which the particular chemical compound used is soluble, such as methanol, ethyl alcohol and acetone, the compound in this case being insoluble in the mixture of the organic solvent and water. It is desirable that the organic solvent should not have a boiling point over 150 degrees centigrade. Or water can be used as the solvent for the chemical which is insoluble in the mixture of water and organic solvents as noted above.

It is one of the advantages of my process that the chemical compound is uniformly distributed throughout the mass of the board. Attempts heretofore made with fiber board by causing a solution of a chemical to impregnate the board and then letting it dry, gave poor results, as the chemical does not crystallize out uniformly throughout the board, and a heavy crust of the chemical usually is formed on the surface.

In applying my process to the fiber board, the board is completely impregnated by simply soaking it in the desired solution, or fircibly impregnating it by immersing the board in the solution and then subjecting the solution to a pressure other than atmospheric. The latter method is preferable, especially where a water solution is used, as it is difficult to wet fiber board. The fibers are water repellant and the air present in the spaces between the fibers retards the entrance of the solution. In order to overcome this, the board is placed in a closed vessel containing the solution, then the solution is subjected to pressure higher than atmospheric or the pressure within the vessel can first be reduced and then allowed to return to atmospheric pressure. The reduction of air pressure withdraws the air from within the board, so that when the pressure is allowed to return to normal, the solution rushes into the board thoroughly saturating it. Too great a pressure or too long an immersion would tend to impair the original properties of the board such as its water repellant property.

After the board has been impregnated with the solution, as noted above, it is subjected to squeezing as by rolls and plates, to reduce it in volume temporarily so as to remove a large proportion of said solution. The solution which has been squeezed out of the board must be removed from contact with the board, as by drainage, to prevent reabsorption as the board increases in volume after the squeezing. The amount of pressure used in squeezing should be such that the board is not crushed and its characteristics impaired. It should be within the elastic limit of the material, that is such a limit with this material, that said material will recover substantially its original volume in a reasonable time. No one ever thought of using squeezing as I do and for my purpose, by taking advantage of the elasticity of a fairly stiff material of substantial thickness, as fiber board. The board is fireproofed by precipitating in it a fireproofing chemical such as ammonium sulphate. The minimum amount of such salt, necessary to effect the fireproofing per unit of the board is well known to the art and can be readily determined for a particular case. It is preferred to cause a solution of the salt containing more of the salt than necessary to fireproof the fiber board, to impregnate the board, and then to squeeze out enough of the solution from the board, so that the salt in the solution remaining in the board is sufficient to effect the fireproofing of the board. The squeezing prepares the board for the more uniform, complete and rapid absorption of alcohol where a water soluble chemical as ammonium sulphate is used, by leaving air spaces for the alcohol to enter as the board recovers its original volume. The entrance of the alcohol precipitates the ammonium sulphate. In the case where an alcohol soluble chemical is used, as triphenyl phosphate, the squeezing prepares the board for the absorption of water. The entrance of the water precipitates the triphenyl phosphate.

Once the precipitate has been formed in the board, it is a preferred further step in my process to subject the board to squeezing at this time to facilitate the drying and to recover a large part of the solvent and the precipitating liquid. As the board recovers its volume from this second squeezing, air spaces are formed within the board which creates a favorable condition for more uniform and rapid drying, drying of the board being the last step in my process. It is preferred to use forced drying, as by the application of heat or vacuum or both.

Some of the chemical compounds suitable for my process where the organic solvent is alcohol and the precipitating liquid is water, are:—triphenyl phosphate, and tetra-bromquinone.

As a particular example of my process where an organic solvent is used, a board of Celotex, one-half inch thick is completely impregnated, either by soaking or forcibly by pressure or by means of vacuum, with an alcohol solution or triphenyl phosphate. It is then squeezed substantially to its elastic limit. The board is then impregnated with water either by soaking or by forcible impregnation, at which time the triphenyl phosphate is precipitated. It is then squeezed again up to substantially its elastic limit, after which it is dried by forced drying.

Some of the chemical compounds suitable for my process where the solvent is water and the precipitating liquid is alcohol are:— ammonium sulphate, sodium tungstate, and di-ammonium phosphate.

As a particular example of my process where water is the solvent, a board of Celotex, one-half inch thick and weighing about one pound is subjected to impregnation by pressure or by means of vacuum with about a 25% water solution of ammonium sulphate until it weighs about four pounds. It is then squeezed until it weighs about two pounds. The product is then soaked in ethyl alcohol or forcibly impregnated therewith, until its weight is increased to about three pounds, precipitating the ammonium sulphate thereby. It is preferred to place the board in the alcohol, after squeezing before it has recovered much of its volume. It is then squeezed again until it weighs about two pounds after which it is dried, preferably by forced drying.

The term "alcohol" as used in the claims is intended to cover the broader meaning of an organic solvent as defined above.

I claim:—

1. The process of impregnating fiber board with a chemical soluble in one liquid but insoluble in said liquid mixed with another, consisting in causing said board to be completely impregnated with a solution of said chemical, removing a substantial amount of said solution from within the board by squeezing the board, then causing said other liquid to mix with the solution remaining in the board, whereby said chemical is precipitated throughout the board, then effecting the removal of the remaining liquids from the board.

2. The process of impregnating fiber board with a chemical soluble in one liquid but insoluble in said liquid mixed with another consisting in forcibly impregnating said board with a solution of said chemical, then squeezing said board with enough pressure to reduce its volume substantially, effecting the removal thereby from within the board of a substantial portion of its solution, then causing said other liquid to mix with the solution remaining in the board, whereby the chemical is precipitated throughout the board, and then effecting the removal of the remaining liquids from the board.

3. The process of impregnating fiber board with a chemical soluble in one liquid but insoluble in said liquid mixed with another, consisting in causing said board to be completely impregnated with a solution of said chemical, removing a substantial amount of said solution from within the board by squeezing said board, then causing said other liquid to mix with the solution remaining in the board, whereby the chemical is precipitated throughout the board, removing a substantial amount of the liquids in the board after precipitation by squeezing said board again, and then drying the board.

4. The process of impregnating fiber board with a chemical soluble in one liquid but insoluble in said liquid mixed with another, consisting in completely impregnating said board with a solution of said chemical, then removing a substantial amount of said solution from within the board by squeezing said board, then forcibly impregnating said board with said other liquid before it has recovered its original volume from the effects of this squeezing, and then effecting the removal of the remaining liquids from the board.

5. The process of impregnating fiber board with a chemical soluble in one liquid but insoluble in said liquid mixed with another, consisting in forcibly impregnating said board with a solution of said chemical, then squeezing the board with enough pressure to reduce its volume substantially effecting the removal thereby from within the board of a substantial portion of its solution, then impregnating the board with said other liquid before it has recovered its original volume from the effects of the squeezing, whereby the liquids are mixed precipitating the chemical thereby, squeezing the board again with sufficient pressure to reduce its volume enough to effect the removal from within the board of enough of the mixture of the liquids to effect the formation of air pockets in the board, and then effecting the drying of the board.

6. The process of impregnating fiber board with a chemical soluble in one liquid but insoluble in said liquid mixed with another, said liquids being miscible, consisting in completely impregnating said board with a solution of said chemical temporarily reducing the volume of the board by squeezing for removal of a portion of said solution from within the board, then causing said other liquid to mix with the solution remaining in the board whereby said chemical is precipitated throughout the board, and then forcibly drying the board.

7. The process of impregnating fiber board with a chemical soluble in one liquid but insoluble in said liquid mixed with another as claimed in claim 6 in which the board is squeezed again, after the chemical is precipitated and before the forced drying for the removal of a substantial portion of the mixture of the liquids.

8. The process of fireproofing fiber board consisting in completely impregnating said board with an alcohol solution of triphenyl phosphate, then squeezing the board, with enough pressure to reduce its volume substantially, effecting the removal thereby from within the board of a substantial portion of its solution, then impregnating said board with water, causing the water to mix with the alcohol and precipitate said phosphate, squeezing the board again with enough pressure to reduce its volume substantial effecting the removal thereby from within the board of a substantial portion of the water and alcohol mixture, and then effecting the drying of the board.

9. The process of impregnating fiber board with a predetermined amount of a chemical soluble in one liquid but insoluble in said liquid mixed with another, and liquids being miscible, consisting in completely impregnating said board with a solution of the desired chemical containing a higher concentration of said chemical than necessary for the predetermined amount, then squeezing said board enough to remove only enough of said solution from within the board so that the chemical in the solution remaining in the board is sufficient to supply said predetermined amount, then causing the other liquid to mix with the solution remaining in the board, whereby the chemical is precipitated throughout the board, and then effecting the removal of the remaining mixture from the board.

10. The process of impregnating fiber board with an alcohol soluble chemical insoluble in water, consisting in impregnating said board with an alcohol solution of the chemical, removing a substantial amount of said solution from within the board by squeezing said board, then causing water to mix with the solution remaining in the board, whereby the chemical is precipitated throughout the board, and then effecting the removal of the remaining water and alcohol from the board.

11. The process of impregnating fiber board with a water solution of a salt insoluble in alcohol, consisting in forcibly impregnating said board with a water solution of the salt, then squeezing said board after being removed from the solution, with enough pressure to reduce its volume substantially, effecting the removal thereby from within the board of a substantial portion of its solution, then causing alcohol to mix with the solution remaining in the board whereby the salt is precipitated throughout the board, and then effecting the removal of the remaining water and alcohol from the board.

12. The process of fireproofing fiber board consisting in forcibly impregnating said board with a water solution of ammonium sulphate, then squeezing said board with enough pressure to reduce its volume substantially, effecting the removal thereby from within the board of a substantial portion of its solution, then causing alcohol to mix with the water and precipitate the ammonium sulphate, squeezing the board again with enough pressure to reduce its volume substantially, effecting the removal thereby from within the board of a substantial portion of the water and alcohol mixture, and then effecting the drying of the board.

13. The process of fireproofing fiber board consisting in completely impregnating said board with an alcohol solution of tetra-bromquinone, then squeezing said board with enough pressure to reduce its volume substantially, effecting the removal thereby from within the board of a substantial portion of its solution, then causing water to mix with alcohol and precipitate the tetra-brom-quinone, squeezing the board again with enough pressure to reduce its volume substantially, effecting, thereby, the removal from within the board of a substantial portion of the water and alcohol mixture, and then effecting the drying of the board.

ALEXANDER WINOGRADOW.